United States Patent [19]

Suzuki

[11] 4,336,978
[45] Jun. 29, 1982

[54] METHOD FOR OPTICALLY MAKING A DIFFUSION PLATE

[75] Inventor: Takashi Suzuki, Yokohama, Japan

[73] Assignee: Canon Kabushiki Kaisha, Tokyo, Japan

[21] Appl. No.: 105,884

[22] Filed: Dec. 20, 1979

[30] Foreign Application Priority Data

Dec. 26, 1978 [JP] Japan ............................. 53/164147
Dec. 27, 1978 [JP] Japan ............................. 53/165863

[51] Int. Cl.³ .......................................... G02B 5/02
[52] U.S. Cl. .................................. 350/167; 350/320
[58] Field of Search ............... 350/162 R, 167, 320, 350/431

[56] References Cited

U.S. PATENT DOCUMENTS 2,726,573 12/1955 Maloff .............................. 350/431
3,619,021 11/1971 Biedermann ..................... 350/3.7
3,698,810 10/1972 Bestenreiner et al. ............ 355/71
3,708,217 1/1973 McMahon ........................ 350/3.7

FOREIGN PATENT DOCUMENTS 919962 12/1946 France ............................. 350/431
53-42726 4/1978 Japan .
53-51755 5/1978 Japan .
209388 7/1940 Switzerland ..................... 350/431

OTHER PUBLICATIONS

Meyerhofer, D. "Holographic and Interferometric Viewing Screens", *Applied Optics*, vol. 12, No. 9, Sep. 1973.

*Primary Examiner*—John K. Corbin
*Assistant Examiner*—Bruce Y. Arnold
*Attorney, Agent, or Firm*—Fitzpatrick, Cella, Harper & Scinto

[57] ABSTRACT

A method for optically making a diffusion plate is disclosed which comprises the steps of illuminating a particular object, recording the light coming from the object on a recording material without imaging said object to form a speckle pattern thereon, and subjecting the recording material to a treatment process. The particular object used in the method is one which has a regular phase and/or amplitude structure in macroscopic view but contains an irregular phase and/or amplitude structure in a view of wavelength level of the light illuminating the object.

6 Claims, 17 Drawing Figures

METHOD FOR OPTICALLY MAKING A DIFFUSION PLATE

BACKGROUND OF THE INVENTION

1. Field of the Invention

The present invention relates to a method of making a diffusion plate having desirable diffusion characteristics by forming an optical speckle pattern in a space and optically recording the speckle pattern. The optical recording process used in the method may involve recording with rays other than visible light rays.

2. Description of the Prior Art

To optically make a diffusion plate there are known various methods. According to one of those known methods a coherent light is projected on a diffusion plate to form a speckle pattern in the exit light beam from the plate and the speckle pattern is photographically recorded on a dry plate. The photographic dry plate is then subjected to a bleaching treatment to form a relief pattern while controlling the height of relief under a predetermined value. The diffusion plate thus produced is used for uniformly illuminating an object in holography (Japanese Patent Application Publication No. 17093/1973).

According to another known method, the light for photographing a diffusion plate is spatial frequency filtered in the light path to form another diffusion plate having rotationally asymmetric diffusion characteristics which is suitably used as a screen for a projector (Japanese Patent Application Publication No. 10265/1974). According to a further known method, the diffused light from a diffusion plate as an object light and a coherent reference light are superimposed on each other and recorded to form a holographic diffusion plate which is useful as a microfilm viewer (U.S. Pat. No. 3,708,217).

Also, the applicant of the present application has already disclosed that when a mask having a suitable opening therein is placed on the diffusion plate to be illuminated by a coherent light, the shape of the speckle pattern in the space wherein it is recorded can be well controlled and made uniform so as to give another diffusion plate having desirable diffusion characteristics (Japanese Patent Application Laid Open No. 51755/1978) and that the diffusion plate thus formed can be used as a very effective mat surface of a focusing plate in a camera finder optical system (Japanese Patent Application Laid Open No. 42726/1978).

All of the known methods described above are common in that as the means for generating a speckle pattern there is used an ordinary diffusion plate, that is, a diffusion plate having rotationally symmetric diffusion characteristics.

SUMMARY OF THE INVENTION

Accordingly, it is an object of the present invention to provide a novel method for making diffusion plates which does not use any ordinary diffusion plate as conventionally used in the above described prior art methods.

It is another object of the invention to provide such a novel method for optically making diffusion plates which allows making a desired diffusion plate in a simple manner while more effectively using the light.

It is a further object of the invention to provide such a novel method for optically making diffusion plates which enables making a diffusion plate having rotationally asymmetric diffusion characteristics in the simplest manner.

Herein, by the term "diffusion plate having rotationally symmetric diffusion characteristics" is meant a diffusion plate which exhibits, when a beam of light is projected perpendicularly on it, a diffusion which is approximately rotation symmetrical relative to the axis of the incident light. Therefore, by the term "diffusion plate having rotation asymmetric diffusion characteristics" is meant a diffusion plate whose diffusion is not symmetrical. For example, a roughened glass surface constitutes an ordinary diffusion plate having rotationally symmetric diffusion characteristics.

Other and further objects, features and advantages of the present invention will appear more fully from the following description taken in connection with the accompanying drawings.

DETAILED DESCRIPTION OF THE PREFERRED EMBODIMENT

Figure 1:
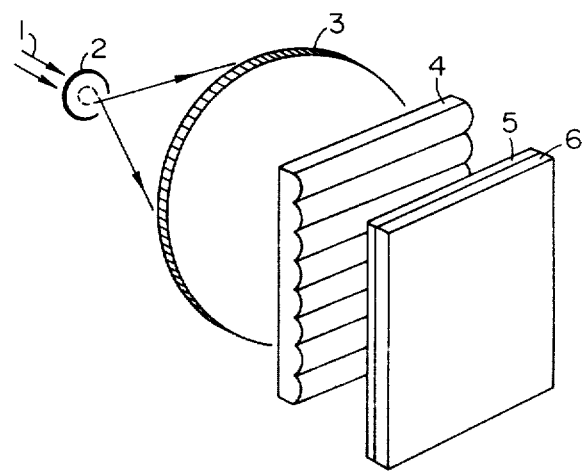
FIG. 1 schematically shows an example of speckle pattern generating apparatus in accordance with the principle of the present invention.
Figure 2:
FIG. 2 shows a speckle pattern as produced by the apparatus.

Referring first to FIG. 1, reference numeral 1 designates a laser beam. A microscopic objective lens 2 transforms the laser beam 1 into a diverging spherical wave which is then converted into a beam of light having an enlarged diameter by a collimator lens 3 to illuminate a lenticular sheet 4. In the beam emitting from the lenticular sheet there appears a pattern as shown in FIG. 2. The pattern is recorded on a silver salt emulsion layer 5 coated on a glass plate 6 and then subjected to a bleaching treatment known per se to produce a relief pattern corresponding to the distribution of intensity of light to which the emulsion layer was exposed. Thus, a diffusion plate is obtained which has rotationally asymmetric diffusion characteristics.

The lenticular sheet 4 used in the first embodiment shown in FIG. 1 is commercially available as one for lenticular stereophotography. Such a lenticular sheet is considered to have a regular structure as far as it is observed microscopically in an order of scale about 100 or more times larger than the wavelength then used. However, when viewed in an order of the wavelength, the structure shows some irregularity therein. Thus, it has rotationally asymmetric diffusion characteristics and, therefore, there can be obtained from it a semi-irregular pattern as shown in FIG. 2. When such irregularity is given to a diffusion plate produced by the present invention, the diffusion plate can be advantageously used as an image projection screen since no more fringes appear between the screen and an image having a periodicity.

Figure 3:
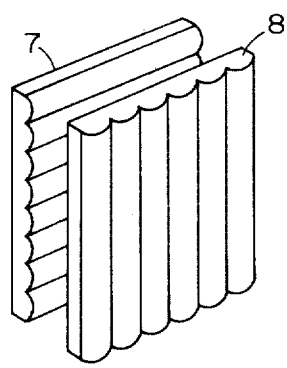
FIG. 3 shows an example of an object to be illuminated in the speckle pattern generating apparatus.
Figure 4A:
FIG. 4A is a speckle pattern as obtained by the apparatus of FIG. 3.
Figure 4B:
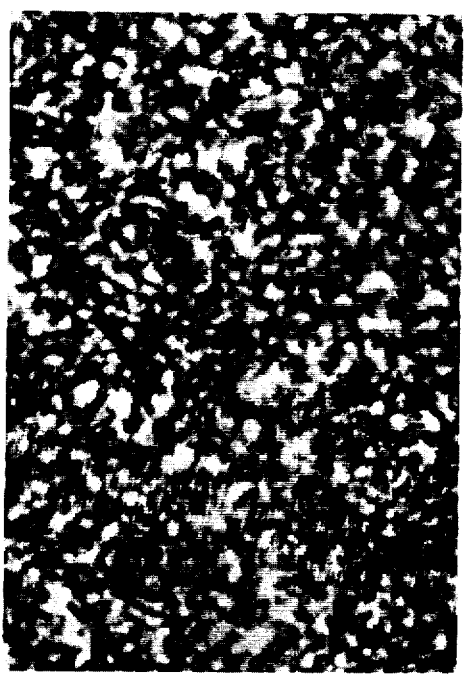
FIG. 4B is another speckle pattern as produced by using ordinary frosted glass.

The single lenticular sheet 4 may be replaced by two lenticular sheets as shown in FIG. 3. The two lenticular sheets 7 and 8 have the same structure and overlap each other with their generating lines of cylindrical lenses intersecting at right angle. By using this orthogonal combination of two lenticular sheets there is obtained a speckle pattern which is better in uniformity of particle size as shown in FIG. 4A. The excellence in uniformity can be seen well by comparing the FIG. 4A speckle pattern with that shown in FIG. 4B, which was obtained by placing an ordinary frosted glass at the position of 4 in FIG. 1.

In the embodiment shown in FIG. 3, if the lenticular sheets 7 and 8 have different pitches from each other, then speckles in a form of an elongate ellipse will be obtained.

Figure 5:
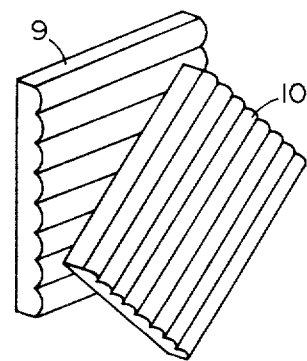
FIG. 5 shows another example of an object useful in the speckle pattern generating apparatus according to the invention.
Figure 6:
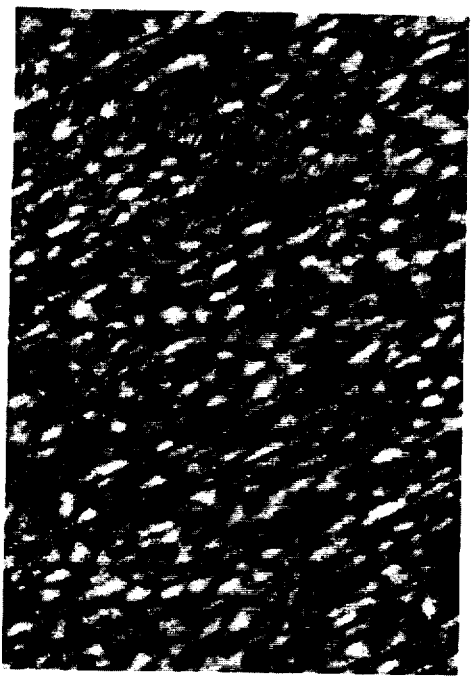
FIG. 6 is a speckle pattern as obtained by the apparatus of FIG. 5.

FIG. 5 shows another combination of two lenticular sheets. In this case, two lenticular sheets 9 and 10 overlap each other with their generating lines intersecting at the angle of 45°. By using this combination at 4 of the apparatus shown in FIG. 1 there was obtained a speckle pattern shown in FIG. 6. The shape of the speckle in this case also approximates an ellipse. The ellipticity of the speckles to be formed may be changed at will by changing the intersection angle of two lenticular sheets.

In this manner, with the shown the optical system, various different speckle patterns having different distributions of speckles, may be formed only by changing the combination of two lenticular sheets prepared using the same specification (pitch, focal length, refractive index, thickness, surface fineness etc.). The change of combination may be accomplished in various ways, for example, by changing the manner of overlap or the distance between the two sheets.

A lenticular sheet is only one example of an object used in the optical system shown in FIG. 1. Many other structures and materials can be used in place of the lenticular sheet 4 so long as they have a regular structure in a macroscopical view. Examples of such objects include a fly eye lens, structures similar to a Fresnel lens diffraction grating, micro optical elements such as a microprism whose structure is far larger than the wavelength of illumination light, various molded plastics having a regular structure, various fabrics, decorated glass plates with patterns, processed metal surfaces and combinations thereof. Many of these examples can be easily found. It makes no difference whether the object is light reflective or transmissive. Also, it is not always necessary for the regular structure to exist as externals. The regular structure may exist as a change of refractive index. The term "regular structure" includes such structure which looks irregular when observed in a scale on the order of a wave-length of the illumination light but shows some regularity when viewed on a larger scale.

Photosensitive material useful for the apparatus shown in FIG. 1 is no limited to a silver salt photosensitive medium only. Other various materials reactive photo-chemically, photo-magnetically or photo-electrically may be used. For example, there may be used DCG (dichromated gelatin), photoresist, photopolymer and thermoplastics according to the wavelength of the laser light source.

Similarly, the light source is not limited to laser light only. According to the structure of the object there may be used various lights ranging from partially coherent light to incoherent light.

The beam of light to illuminate the object according to the invention is not limited to a plane wave. Diverging or converging spherical waves and also wave fronts containing aberration may be used. It is not always necessary to use a single beam. Two or more beams may be used to illuminate the object.

Now, embodiments of multibeam illumination systems are described with reference to FIGS. 7 through 11.

Figure 7:
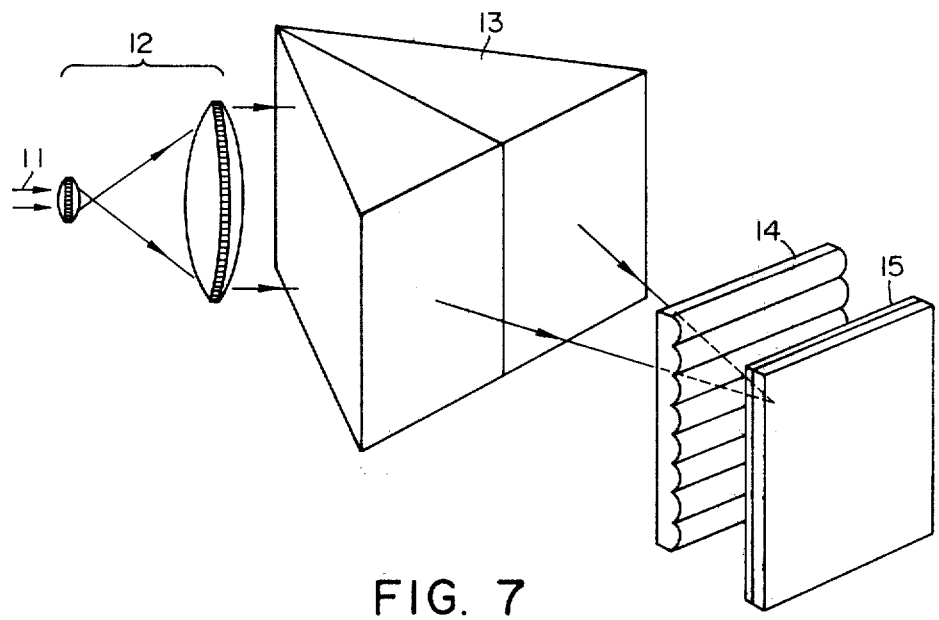
FIG. 7 illustrates another example of speckle pattern generating apparatus in accordance with the principle of the invention.
Figure 8:
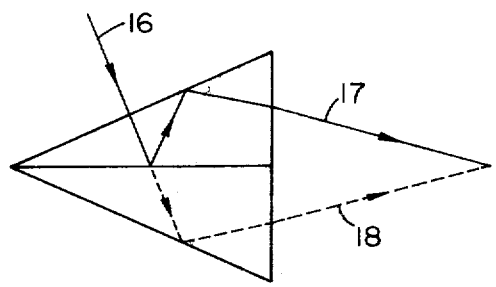
FIG. 8 is an explanatary diagram of a Kester prism used in the apparatus shown in FIG. 7.
Figure 9:
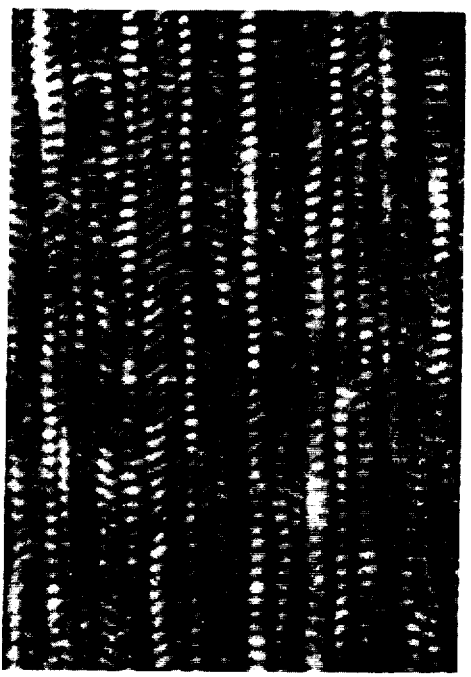
FIG. 9 is a speckle pattern as obtained by the apparatus of FIG. 7.

In the embodiment shown in FIG. 7 there is used a Kester prism. As seem from FIG. 8, Kester prism is generally used to amplitude video an incident beam 16 into two beams 17 and 18.

Figure 10:
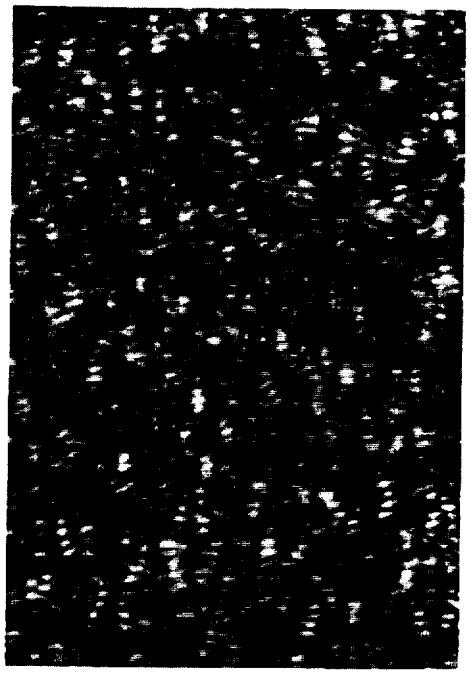
FIG. 10 is a speckle pattern as obtained when the single lenticular sheet in the FIG. 7 apparatus is replaced by the two lenticular sheets shown in FIG. 3.

In FIG. 7, 11 is a laser beam, 12 is a beam expander optical system, 13 is a Kester prism, 14 is a lenticular sheet and 15 is a photorecording material. When the same lenticular sheet as used in FIG. 1 embodiment for the pattern shown in FIG. 2 was used in the optical system shown in FIG. 7, there was obtained a pattern shown in FIG. 9. Compared with the pattern shown in FIG. 2, the latter is further divided periodically by the interference ring produced by the interference of the two beams. FIG. 10 shows a pattern obtained by using the orthogonal combination of two lenticular sheets shown in FIG. 3 in place of the single lenticular sheet 14 in the embodiment shown in FIG. 7. Comparing the pattern with that shown in FIG. 4A it is also seen that the former is further divided periodically.

The period at which the pattern is divided can be controlled in a simple manner by changing the angle between the two beams incident upon the object. This constitutes an effective control means very useful for making a diffusion plate having high uniformity of speckle size and high directivity in a certain direction. For uniformity of speckle size it is desirable that the pitch of the interference fringes be set to be equal to or a little smaller than the average size of speckles obtained by a single illumination beam.

Figure 11:
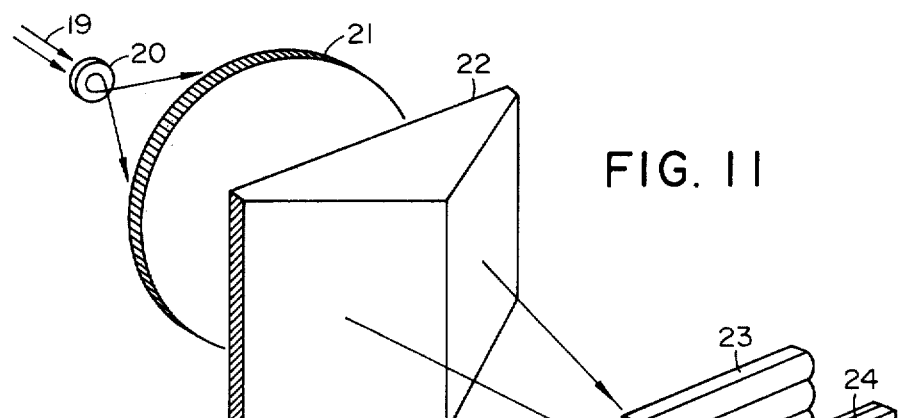
FIG. 11 shows a further example of a speckle pattern generating apparatus in accordance with the principle of the invention.
Figure 12:
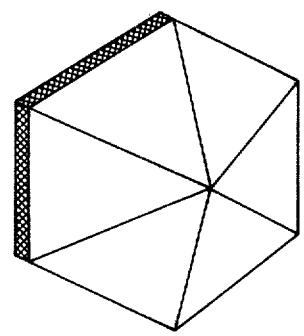
FIG. 12 shows another form of prism in place of the Fresnel biprism of the apparatus shown in FIG. 11.

Another embodiment for two beam illumination is shown in FIG. 11. In this embodiment, a Fresnel biprism 22 is used to obtain the two beams for illuminating the object. The biprism 22 may be replaced by a polygonal pyramid prism as shown in FIG. 12. Also, other various multibeam illumination systems using a cone prism, an elliptical cone prism, a diffraction grating and the like may be used to control the distribution of the speckle pattern in accordance with the embodiment shown in FIG. 11.

Within the scope of the invention described above, other changes and modifications can be made to all the embodiments shown in FIGS. 1, 7 and 11.

As will be understood from the foregoing, the method of the present invention has many advantages over the prior art.

Many variations of speckle pattern are obtainable. The apparatus for carrying out the method is simple in structure and inexpensive. As the object to be illuminated, those objects can be used which are high in either their transmittivity or reflection factor. Since the speckle size can be changed depending upon the scale of structure of object and there is no need of interposing any other optical system between the object and the photo-recording material, it is possible to shorten the distance between the object and recording material. Moreover, there is no need of shutting off the light by a spatial frequency filter or mask. These facts bring forth the advantage of more effective use of light to make the diffusion plate. Therefore, to carry out the method of the invention, low sensitive photo- or thermal recording materials and a larger size of recording materials can be used. By using a high speed shutter a stable and safe operation of the apparatus is assured. The reliability of the apparatus is remarkably improved thereby.

The objects used in the invention can be used also in other types of optical diffusion plate making methods. For example, they are useful as speckle-like pattern generating apparatus in a spatial frequency filtering methods, masking methods, holographic methods, and the like. Also, they may be used as a pattern generator in graphics.

Diffusion plates obtained in accordance with the invention have a wide area of application including cameras, micro-viewers and 8 mm film picture screen diffusion illumination apparatus. The diffusion plates of the invention have the most suitable diffusion characteristics since they can be adjusted to the applications and purposes for which they are to be used. The diffusion plates of the invention can be produced in a mass production process using various known reproduction methods; therefore cheap diffusion plates can be supplied to users. It is evident that the present invention makes a great contribution to the industry.

Another embodiment of the invention for making diffusion plates by recording speckle pattern will be described with reference to FIG. 13.

Figure 13:
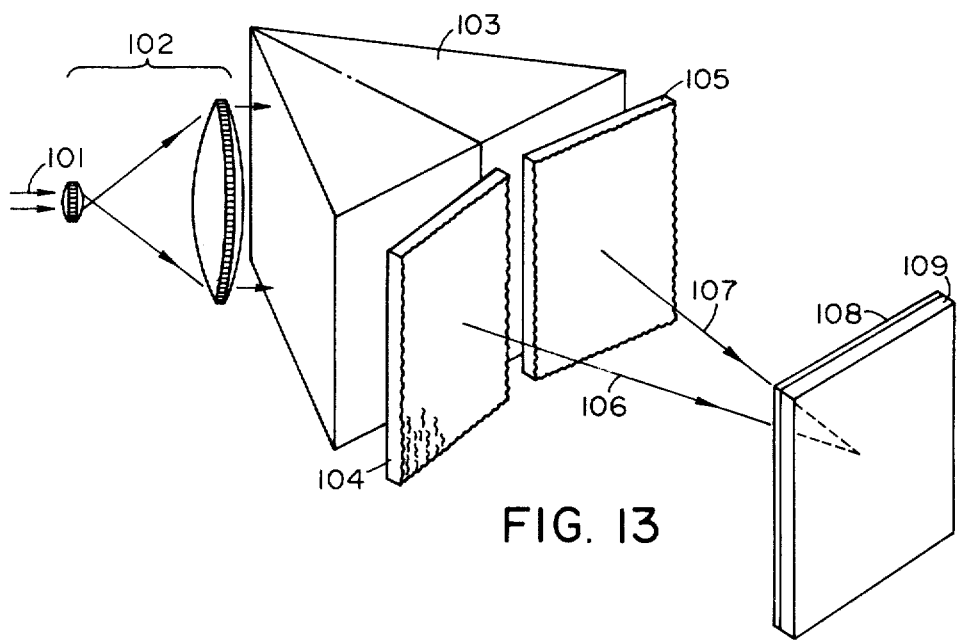
FIG. 13 illustrates another diffusion plate making method.

In FIG. 13, the reference numeral 101 designates a laser beam, 102 is a beam expander optical system and 103 is a Kester prism. Parallel rays exiting from the beam expander optical system are transformed into two beams coherent with each other. These two coherent beams enter two diffusion plates 104 and 105 respectively. If these diffusion plates were omitted, the beams would run along the lines 106 and 107 and produce an interference fringe in space while the two coherent beams are superposed on each other. A photo-recording material such as a dry plate 109 coated with a silver salt emulsion layer 108 is disposed in the space where said interference fringe would formed.

Figure 14:
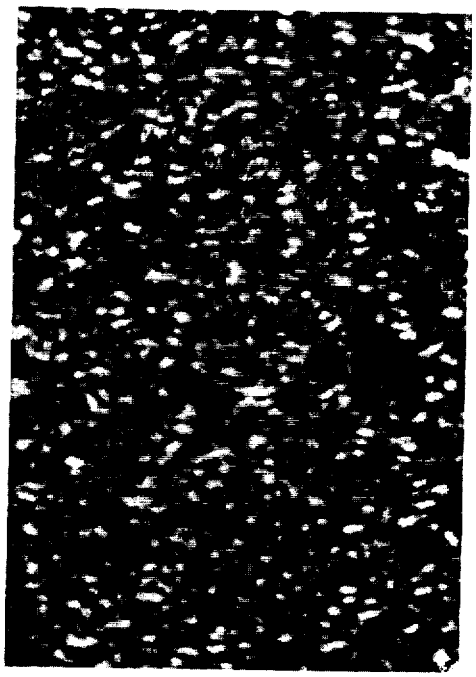
FIG. 14 is a speckle pattern obtained according to the invention and taken by microscopic photography.

The pattern shown in FIG. 14 is that obtained with the above described speckle pattern generator shown in FIG. 13. Comparing FIG. 14 with FIGS. 4A and 4B it is seen that the pattern obtained with the apparatus shown in FIG. 13 is finer than those of FIGS. 4A and 4B and looks as if the latter speckle patterns were further divided by periodical interference fringes. The pitch of this division is a function of the angle between the two beams 106 and 107.

The dry plate on which the above pattern was recorded is subjected to a known bleaching treatment. By this treatment there appears in the emulsion layer a distribution of refractive index or a relief pattern corresponding the distribution of amplitude shown in FIG. 14. The optical body thus obtained functions as a diffusion plate which is different from a conventional diffusion plate which is usually prepared by rubbing with sand. The diffusion plate obtained from the pattern shown in FIG. 14 has a directivity in its diffusion whereas the conventional one has no directivity and its diffusion is rotation symmetrical.

Diffusion plates obtainable employing the above described apparatus have many applications. A representative application form of such diffusion plate is a screen for various image projecting apparatus. For example, the diffusion plate may be advantageously used for a focusing screen mounted in the finder optical system of a camera, micro viewer screen or projector screen.

The material for recording the formed pattern can be suitably selected from various available materials taking into consideration the wavelength of laser beam used and the application form of the diffusion plate intended. Photoresist, dichromated gelatin, photo-polymer, thermoplastics and chalcogens are examples of useful materials. The diffusion plates recorded on these materials can be reproduced in mass production employing various known copying methods to supply inexpensive diffusion plates to users.

Arrangement of the optical system necessary for carrying out the above described method is not limited only to that shown in FIG. 13. Various changes and modifications can be made therein. For example, the diffusion plates may be disposed at any position between the light source and recording material. A diffusion plate may be disposed between the Kester prism 103 and beam expander 102.

A further method of the invention for making diffusion plates will be described with reference to FIG. 15.

Figure 15:
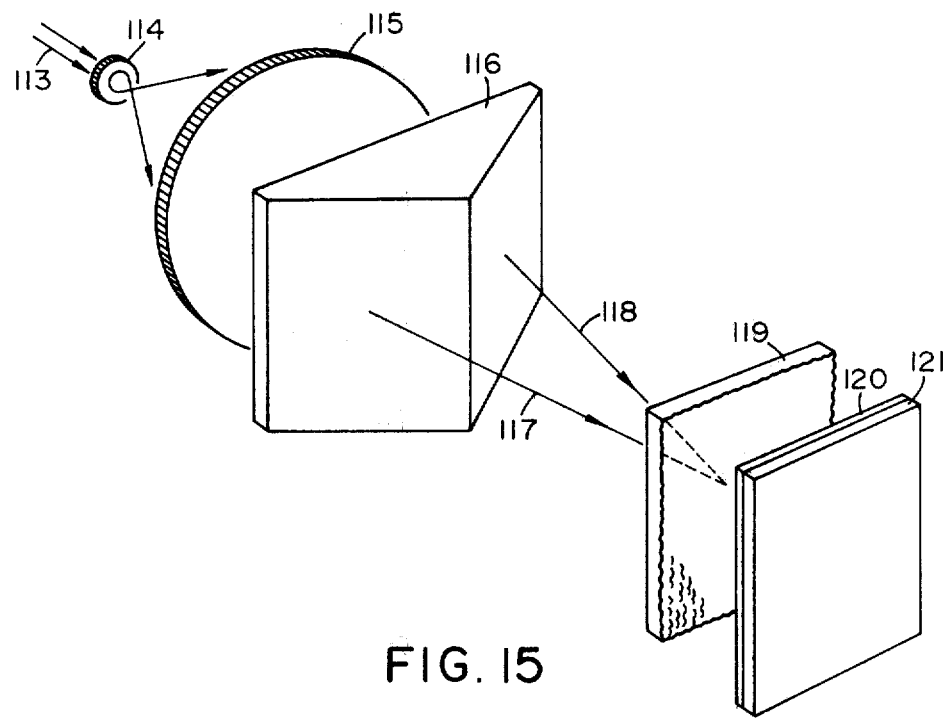
FIG. 15 illustrates another embodiment of the invention.

In FIG. 15, the reference numeral 113 designates a laser beam, 114 is a microscope objective lens and 115 is a collimator lens. Collimated rays from the collimator lens run toward a Fresnel biprism 116 which functions to wave front divide the collimated rays and to make two beams running along the lines 117 and 118 toward a diffusion plate 119. A recording material 121 having theron a photosensitive layer 120 disposed in a plane where, if the diffusion plate 119 were omitted, an interference fringe resulting from the two beams would be formed. Thus, like the case of FIG. 13 there is also obtained a pattern as shown in FIG. 14.

Figure 16:
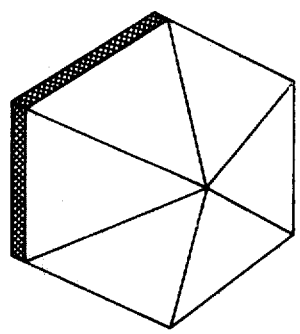
FIG. 16 shows another form of prism substitutive for Fresnel biprism shown in FIG. 5.

In the optical system shown in FIG. 15, the diffusion plate may be disposed between the lens 115 and prism 116. Also, as a beam splitter, a polygonal pyramid prism as shown in FIG. 16 may be used in place of the prism 116. Similarly, a cone prism and elliptic core prism may be used to continuously split the incident beam and illuminate the diffusion plate by two or more beams. For some cases the diffusion plate may be illuminated by using a beam in which the direction of propagation continuously changes. Use of these modifications makes it possible to obtain many different speckle patterns having different forms and distributions. A diffraction grating or the like also may be used as the beam splitter.

The above described method is distinguished from the conventional optical diffusion making methods such as frequency filtering method in the following points:

According to the conventional frequency filtering method, the maximum spatial frequency of the diffusion plate finally produced is limited by the maximum spatial frequency of the diffusion plate used as the object. There is no possibility of the former being higher than the latter. However, the above described method makes it possible. For example, by widening the angle which the two illumination beams form between them, a pattern can be formed which has a higher spatial frequency than the maximum spatial frequency of the diffusion plate used as the object.

Also, according to the above described method, the number of beams used to illuminate the object as well as the angle between the illumination beams can be changed in a relatively simple manner and therefore control of pattern can be carried out easily. The effect of pattern control can be checked at once. It is no longer necessary to cut off a larger portion of the light by a spatial frequency filter or a mask. The distance between the diffusion plate and recording material can be reduced as compared with the conventional ones. Therefore, the efficiency of light utilization is remarkedly improved according to the method. Moreover, it is made possible to use a high speed shutter and recording materials of low sensitivity. These mean a great contribution to the industry.

While the invention has been described in its preferred embodiments, it will be understood by those skilled in the art that the foregoing and other changes in form and details can be made therein without departing from the spirit and scope of the invention.

What I claim is:

1. A method for optically making a diffusion plate comprising the steps of:
   illuminating an object having a regular macrostructure and an irregular microstructure with coherent light;
   directing the light coming from said object without imaging said objects, onto a recording material to form a speckle pattern thereon; and
   subjecting said recording material to a treatment so as to obtain a diffusion plate.

2. A method for optically making a diffusion plate comprising the steps of:
   illuminating an object having rotation asymmetric diffusion characteristics with coherent light;
   recording the light coming from said object without imaging said object, onto a recording material to form a speckle pattern thereon; and
   subjecting said recording material to a treatment so as to obtain a diffusion plate.

3. A method for optically making a diffusion plate according to claim 1 or 2 wherein said object is an object which contains a structure composed of a number of microprism elements closely arranged, each of said elements being imcomparably larger than the wavelength of said illumination light.

4. A method for optically making a diffusion plate according to claim 1 or 2 wherein said object is a fly eye lens.

5. A method for optically making a diffusion plate according to claim 1 or 2 wherein said object is a lenticular lens.

6. A method for optically making a diffusion plate according to claim 1 or 2 wherein said object is a diffraction grating.

* * * * *